Figure 1:
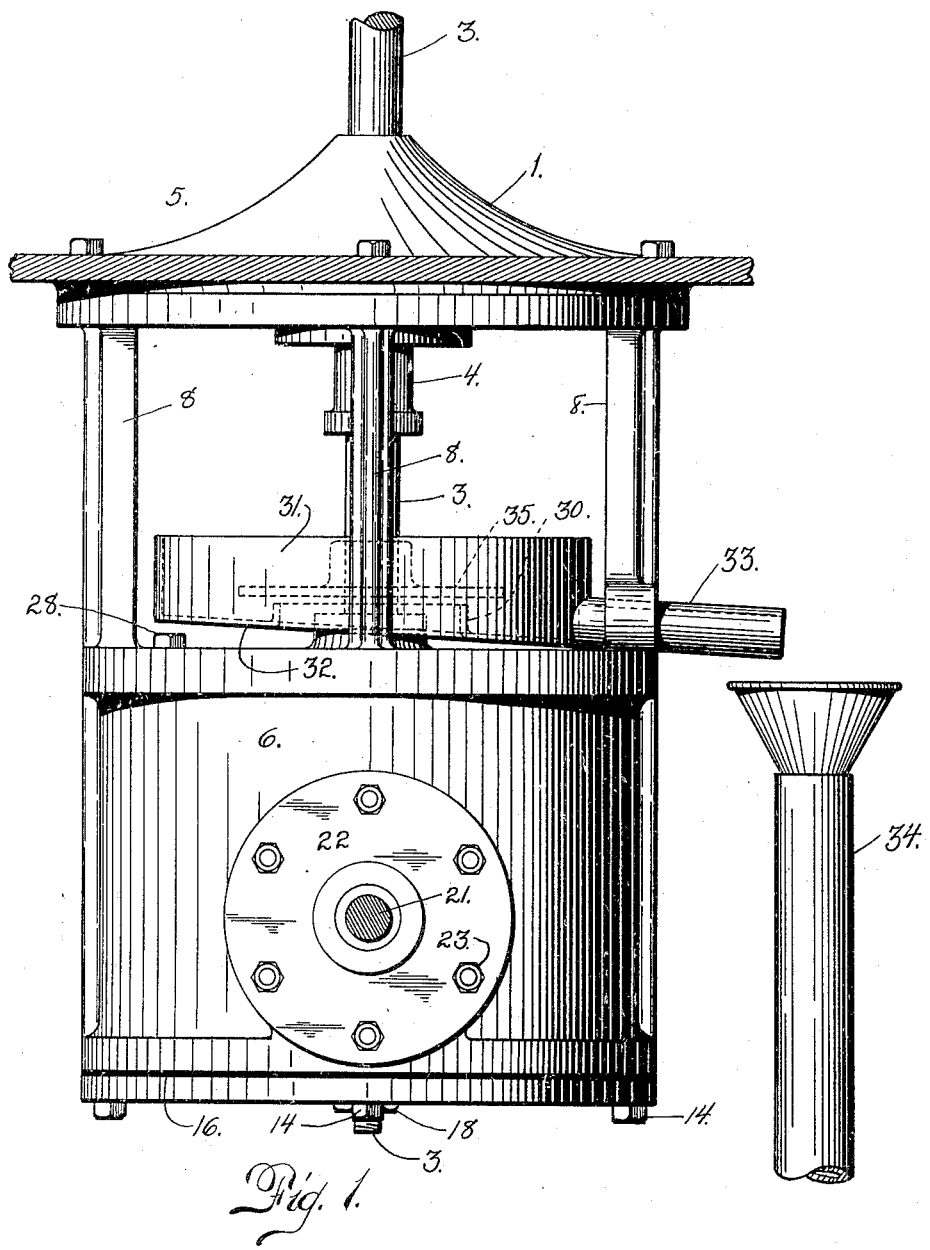

UNITED STATES PATENT OFFICE.

NELSON A. LOCKWOOD, OF OGDEN, UTAH.

DRIVING-HEAD FOR SUGAR APPARATUS AND GUARD THEREFOR.

1,232,343.   Specification of Letters Patent.   Patented July 3, 1917.

Application filed January 23, 1917. Serial No. 143,897.

*To all whom it may concern:*

Be it known that I, NELSON A. LOCKWOOD, a citizen of the United States, residing at Ogden, in the county of Weber, and State of Utah, have invented certain new and useful Improvements in Driving-Heads for Sugar Apparatus and Guards Therefor; and I do hereby declare the following to be a full, clear, and exact description of the invention, such as will enable others skilled in the art to which it appertains to make and use the same.

This invention relates to sugar apparatus, but more particularly to an improved driving head arrangement for the apparatus commonly known in the beet sugar industry as saccharate coolers, with which is carried out the Steffen's process for recovering the sugar contents, remaining in beet molasses, by precipitating the sugar in the form of sucrate of lime.

The cooler itself not being specifically claimed, it is not thought to be essential in the present application to unnecessarily illustrate the same, but to more clearly understand the application of my invention, it may be briefly referred to as broadly comprising a closed receptacle, providing a water cooling tank with open ended tubes extending therethrough and headed, as customary, in tube header plates, which latter also provide, within the receptacle, molasses compartments above and below the water tank. The heated molasses solution, into which powdered lime is suitably introduced in proportionate charges and at proper intervals, is caused to circulate, upwardly through the center of the apparatus and downwardly through the outer tubes, by means of a rotary mixer and impeller horizontally disposed in the lower molasses compartment. This impeller is mounted on a vertical shaft, passing through the bottom of the cooler receptacle, and is operated by beveled driving gears disposed immediately below the same. After precipitation has been completed, the contents are withdrawn and further treatment is effected through the medium of filter presses or other suitable devices, as well understood.

While this type of machine is very effective in operation, it has given much trouble in that, regardless of careful packing, after the machine has been running a short time, the lime contained solution will leak through the stuffing box and down along the shaft on to the operating gears, rapidly cutting or eating away the teeth thereof and thus disabling the apparatus.

The main object of the present invention is to overcome this serious defect by an improved arrangement, whereby the operating gears are enveloped by a casing, adapted to contain oil or grease, in combination with a drip pan, disposed above said casing, associated with a revolving disk for deflecting the leakage, from said cooler, centrifugally into said drip pan, from whence it is suitably conveyed off, the whole arrangement being such that the gears are maintained well lubricated at all times, and free from the destructive contamination of said lime.

Other advantages of my improvements will appear from the following description, the particular features of novelty being stated more succinctly in the appended claims.

Referring to the accompanying drawings, forming a part of this application, like characters designate the same parts in the different views, of which—

Figure 2:
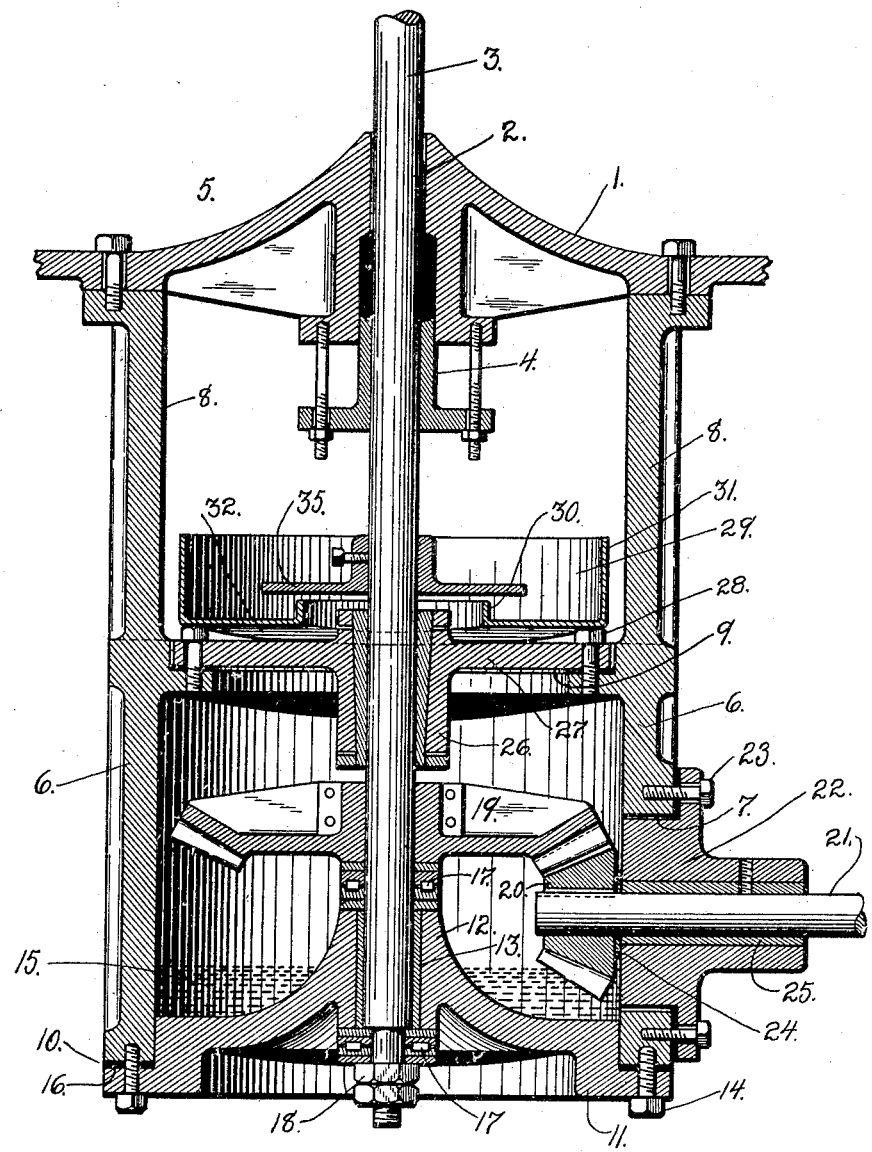

Figure 1, is a view in elevation showing my specific improvements arranged beneath the bottom of a Steffen's saccharate cooler, the details of the cooler proper being omitted for simplicity of illustration, and Fig. 2, is a central vertical sectional view, taken along a plane at right angles to that of Fig. 1.

1 designates the broken-away bottom of a Steffen's saccharate cooler as referred to, which bottom is apertured as at 2 for the passage of the impeller shaft 3, a suitable stuffing box 4 being provided to assist in preventing leakage from the cooler.

Within the molasses chamber 5, at the lower end of the cooler, is disposed a horizontal rotary mixer and impeller element (not shown) secured on the upper portion of the shaft 3 to rotate therewith and cause the mixing and circulation of the molasses solution in the cooler.

The shaft 3 projects downwardly through a gear casing, comprising a cylinder 6, preferably of cast metal and apertured in its periphery, as at 7, to receive a journal bearing boss for the driving shaft of the machine.

The bottom 1 of the cooler proper is supported by any suitable means at a position above the gear casing and substantially distant therefrom. In the drawings this is satisfactorily shown by the standards 8, which may be integral continuations of the gear casing, the cooler bottom being suitably bolted to the flanged tops of said standards as desired. Obviously this supporting means may be differently constituted.

The upper and lower ends of the gear casing casting 6 are normally open, as at 9 and 10 respectively, and the bottom opening 10 is closed by a circular base 11 having an upwardly and downwardly directed central boss 12, bored to receive a bushing element 13 for the lower end of the shaft 3.

The base closure 11 is detachably secured to the bottom of the gear casing by means of stud bolts 14, and this bottom forms with the casing wall a lubricating chamber 15, for containing oil or grease for the driving gears, hereinafter referred to. To prevent leakage a gasket ring 16 may be employed as shown.

On the upper and lower faces of the central boss element 12 are suitably arranged appropriate washer elements and raceway elements for ball or roller bearings, generally designated at 17, for reducing friction and taking up the thrust on the impeller shaft 3, the lower end of which shaft is reduced and threaded as usual and held within its journal by lock nuts 18 and a cotter pin if desired.

A bevel gear 19, with its teeth disposed downwardly, is mounted on the shaft 3 to rotate the latter, and the lower face of the hub of this gear bears on the upper bearing elements 17.

This gear 19 is in mesh with a bevel pinion 20 mounted on the inner end of a drive shaft 21 supported by the bearing element 22, which latter is detachably secured, within the aperture 7, to the gear casing by the stud bolts 23. A wear washer is shown at 24 and a journal bushing at 25.

This whole arrangement has its important functions in that, by mounting the driven gear 19 above the pinion 20, a lesser quantity of oil or grease is required in the lubricating chamber, the smaller pinion simply dipping in the oil instead of the larger gear revolving therein in submerged relation. Also both of the operating gears being supported by readily detachable bearings, the assembling and removal of these parts are greatly facilitated, for it will be obvious that by this arrangement the pinion may be quickly removed by unfastening the bolts 23 and pulling the drive shaft 21 out with its pinion and bearing 22 thereon. To remove the large gear, when the pinion is out, it is only necessary to unfasten the nuts 18 and bolts 14 to release the base closure 11 and its complementary parts, when the large gear may be readily displaced. Ready access is thus also afforded for cleaning out the gear casing or loading the lubricating chamber with fresh oil and grease.

Dealing now with the primary essential features of the invention, in order to maintain the impeller shaft 3 lined up to prevent excessive wear and leakage in the stuffing box 4, which is the main defect of these machines, I mount an additional bearing 26, provided with a bushing, between the operating gears and the stuffing box. This journal is supported by means of a partition element or spider 27, secured by stud bolts 28 to an internal support formed at the top of the gear casing.

Supported by this partition element 27 is a drip pan 29, having a central opening 30 freely encircling the shaft 3, and having an upwardly disposed shallow wall annularly surrounding said opening, the said pan also having a deeper peripheral wall 31. This drip pan is mounted stationary and is so tilted that its bottom inclines downwardly toward one side of the machine, being provided at its lowermost position with an outlet spout 33 of any suitable form leading to a discharge pipe 34 or sump in the floor.

Within this drip pan 29 is a deflecting disk 35 mounted on the shaft 3 to revolve therewith immediately above said central shallow annular wall surrounding said opening 30 and below said stuffing box 4, the disk being of a diameter sufficiently great to provide a revolving cover for said opening 30, and adapted to receive the drippings or leakage from said stuffing box and throw said leakage, by centrifugal force, out into the drip pan, where it is conveyed off through the spout opening 33 as stated.

From the foregoing complete disclosure, it is thought that a further statement of operation would only be redundant, but while I have shown and described a preferred embodiment of the invention, it will be understood that I do not limit myself to the exact details as disclosed, excepting as come within the purview of the ensuing claims contemplating a fair range of equivalents.

What I do claim as new and patentable, is:—

1. In sugar apparatus as set forth, including a saccharate cooler having a shaft aperture through its bottom, the combination of an impeller shaft extending through said aperture into the lower molasses chamber of said cooler; operating gearing connected to said shaft; and deflecting means mounted between said gearing and said shaft aperture for receiving the leakage of the molasses solution through said shaft aperture and diverting same away from said gearing, substantially as described.

2. In sugar apparatus as set forth, including a saccharate cooler having a shaft aperture through its bottom, the combination of an impeller shaft extending through said aperture into the lower molasses chamber of said cooler; operating gearing connected to said shaft; a deflecting disk secured to and rotating with said shaft, between said gearing and said shaft aperture, said disk receiving the leakage of the molasses solution through said shaft aperture; and a drip receptacle mounted to receive the centrifugal discharge from said disk, substantially as described.

3. In sugar apparatus as set forth, including a saccharate cooler having a shaft aperture through its bottom, the combination of an impeller shaft extending through said aperture into the lower molasses chamber of said cooler; operating gearing connected to said shaft; a drip pan having a central opening in its bottom freely encircling said shaft, and having an upwardly disposed shallow wall annularly surrounding said opening, said drip pan being located between said gearing and said shaft aperture; and a disk mounted fast on said shaft, within said drip pan, to function as a revolving cover for said central opening and a deflector for the leakage of the molasses solution through said shaft aperture, substantially as described.

4. In sugar apparatus as set forth, including a saccharate cooler having a shaft aperture through its bottom and a stuffing box therefor, the combination of a gear casing disposed below and substantially distant from the bottom of said cooler; an impeller shaft journaled at its lower end within said gear casing and at its upper end extending through said stuffing box and shaft aperture into the lower molasses chamber of said cooler; operating gears connected to said shaft within said gear casing; an upper journal bearing for said shaft, located between said gears and said cooler bottom, for holding said shaft in line and relieving excessive wear in said stuffing box; and means mounted between said upper journal bearing and the bottom of said cooler for diverting the leakage of the molasses solution, through said stuffing box, away from the lower portion of said shaft and its operating gears, substantially as described.

5. In sugar apparatus as set forth, including a saccharate cooler having a shaft aperture through its bottom, the combination of a gear casing disposed below and substantially distant from the bottom of said cooler, said gear casing being normally open at its bottom and provided in its peripheral wall with an enlarged opening; a removably secured base closure, for the open bottom of said casing, said base closure and casing wall providing a lubricating chamber, and said base closure having a central boss bored to provide a bearing; an impeller shaft journaled at its lower end in said boss bearing and at its upper end extending through said shaft aperture into the lower molasses chamber of said cooler; a bevel gear fast to said shaft and mounted on said bearing boss; a driving shaft bearing removably secured over said enlarged opening in the peripheral wall of said casing; a driving shaft journaled therein; a bevel pinion fast on the end of said driving shaft, meshing with said bevel gear and dipping in said lubricating chamber; and deflecting means mounted between said gears and said shaft aperture in the bottom of said cooler, for diverting the leakage of the molasses solution, through said shaft aperture, away from the lower portion of said shaft and its operating gears, substantially as described.

In testimony whereof, I affix my signature.

NELSON A. LOCKWOOD.

Copies of this patent may be obtained for five cents each, by addressing the "Commissioner of Patents, Washington, D. C."